United States Patent
Rosasco

Patent Number: 5,545,361
Date of Patent: Aug. 13, 1996

[54] METHOD OF MAKING A VEHICLE BUMPER WITH FOAM THEREIN USING A DEFORMABLE PLUG

[75] Inventor: James J. Rosasco, Grand Haven, Mich.

[73] Assignee: Shape Corporation, Grand Haven, Mich.

[21] Appl. No.: 453,234

[22] Filed: May 30, 1995

Related U.S. Application Data

[62] Division of Ser. No. 194,728, Feb. 10, 1994.

[51] Int. Cl.⁶ .................................................. B29C 44/06
[52] U.S. Cl. ........................ 264/45.2; 264/46.6; 264/278; 264/313
[58] Field of Search ................................. 264/46.6, 46.9, 264/278, 45.2, 313

[56] References Cited

U.S. PATENT DOCUMENTS

| | | |
|---|---|---|
| 1,727,982 | 9/1929 | Jacobs . |
| 3,340,336 | 9/1967 | Bender ................................. 264/46.6 |
| 3,491,171 | 1/1970 | French . |
| 3,514,144 | 5/1970 | Alderfer . |
| 3,596,622 | 8/1971 | Moore ................................. 114/69 |
| 3,666,310 | 5/1972 | Burgess et al. . |
| 3,690,710 | 9/1972 | Curran . |
| 3,739,882 | 6/1973 | Schwenk et al. . |
| 3,782,768 | 1/1974 | Moore ................................. 293/110 |
| 3,787,083 | 1/1974 | Perlberg . |
| 3,876,082 | 4/1975 | Fehl et al. . |
| 3,880,454 | 4/1975 | Haberle et al. . |

(List continued on next page.)

FOREIGN PATENT DOCUMENTS

| | | |
|---|---|---|
| 1210696 | 2/1966 | Germany . |
| 2115262 | 10/1972 | Germany . |
| 2155018 | 5/1973 | Germany . |
| 2205327 | 8/1973 | Germany . |
| 2246220 | 3/1974 | Germany . |
| 266642 | 5/1988 | Germany . |
| 3936194 | 5/1991 | Germany . |
| 57-198142 | 12/1982 | Japan . |
| 59-100032 | 6/1984 | Japan ................................. 264/46.6 |
| 61-89146 | 5/1986 | Japan . |
| 62-94453 | 4/1987 | Japan . |
| 59-85759 | 6/1988 | Japan . |
| 59-230847 | 7/1988 | Japan . |
| 2179724 | 7/1990 | Japan . |
| 2178007 | 7/1990 | Japan . |
| 2185714 | 7/1987 | United Kingdom . |

OTHER PUBLICATIONS

IBM Technical Disclosure Bulletin vol. 11, No. 11 (Apr. 1989).

*Primary Examiner*—Allan R. Kuhns
*Attorney, Agent, or Firm*—Price, Heneveld, Cooper, DeWitt & Litton

[57] ABSTRACT

A bumper construction for vehicles constructed of a single strip of metal roll-formed into a completely enclosed tubular member in which a foamed-in-place material is located in and completely fills only a central section of the tubular member a relatively short distance on each side of the central axis of the vehicle. An apparatus is provided for manufacturing roll-formed bumpers partially filled with a foam-in-place material, the bumpers including material defining a continuous closed section defining an open interior and opposing open ends. The apparatus includes a turntable with a plurality of holders including arms shaped to extend partially into the bumpers, and a plug on the end of each arm configured to block off the open interior of the bumper. The holders are pivotally mounted on the turntable so that a bumper can be slipped onto a selected holder, pivoted to an upright position, and then rotated by the turntable under an injector for dispensing foamable reaction injectable urethane (RIM) material. The plug is squeezed and thus expanded to seal off the interior space, after which the RIM material is dispensed into the upright open end. The upright position is held for several seconds to allow the RIM material to cure, and then the holder is then pivoted down so that the bumper can be readily removed. A method corresponding to the above-noted apparatus is also disclosed.

8 Claims, 5 Drawing Sheets

U.S. PATENT DOCUMENTS

| | | |
|---|---|---|
| 3,894,131 | 7/1975 | Speech .................................. 264/45.2 |
| 3,944,271 | 3/1976 | Eggert, Jr. . |
| 4,061,384 | 12/1977 | Montgomery et al. . |
| 4,061,385 | 12/1977 | Schwartzberg . |
| 4,078,837 | 3/1978 | Auth . |
| 4,116,893 | 9/1978 | Flanagan .............................. 264/46.6 |
| 4,165,113 | 8/1979 | Casse . |
| 4,186,162 | 1/1980 | Daley . |
| 4,245,970 | 1/1981 | St. Onge .............................. 264/45.2 |
| 4,348,042 | 9/1982 | Scrivo . |
| 4,460,205 | 7/1984 | Glance . |
| 4,542,925 | 9/1985 | Huber et al. . |
| 4,569,865 | 2/1986 | Placek . |
| 4,715,645 | 12/1987 | Lewis et al. . |
| 4,762,352 | 8/1988 | Enomoto . |
| 4,826,226 | 5/1989 | Klie et al. . |
| 4,898,630 | 2/1990 | Kitoh et al. .............................. 264/55 |
| 4,998,761 | 3/1991 | Bayer et al. . |
| 5,004,572 | 4/1991 | Kurimoto .............................. 264/46.9 |
| 5,005,887 | 4/1991 | Kelman . |
| 5,078,439 | 1/1992 | Terada et al. . |
| 5,080,411 | 1/1992 | Stewart et al. . |
| 5,092,512 | 3/1992 | Sturrus et al. ........................ 228/146 |
| 5,096,243 | 3/1992 | Gembinski . |
| 5,139,297 | 8/1992 | Carpenter et al. . |
| 5,265,925 | 11/1993 | Cox et al. ............................ 264/328.1 |

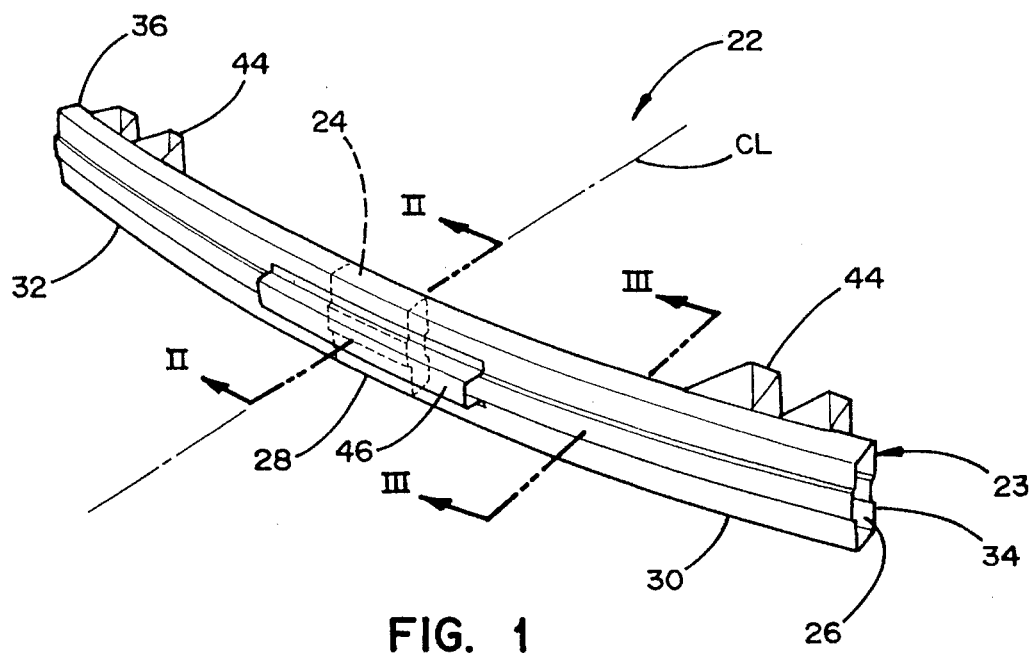
FIG. 1
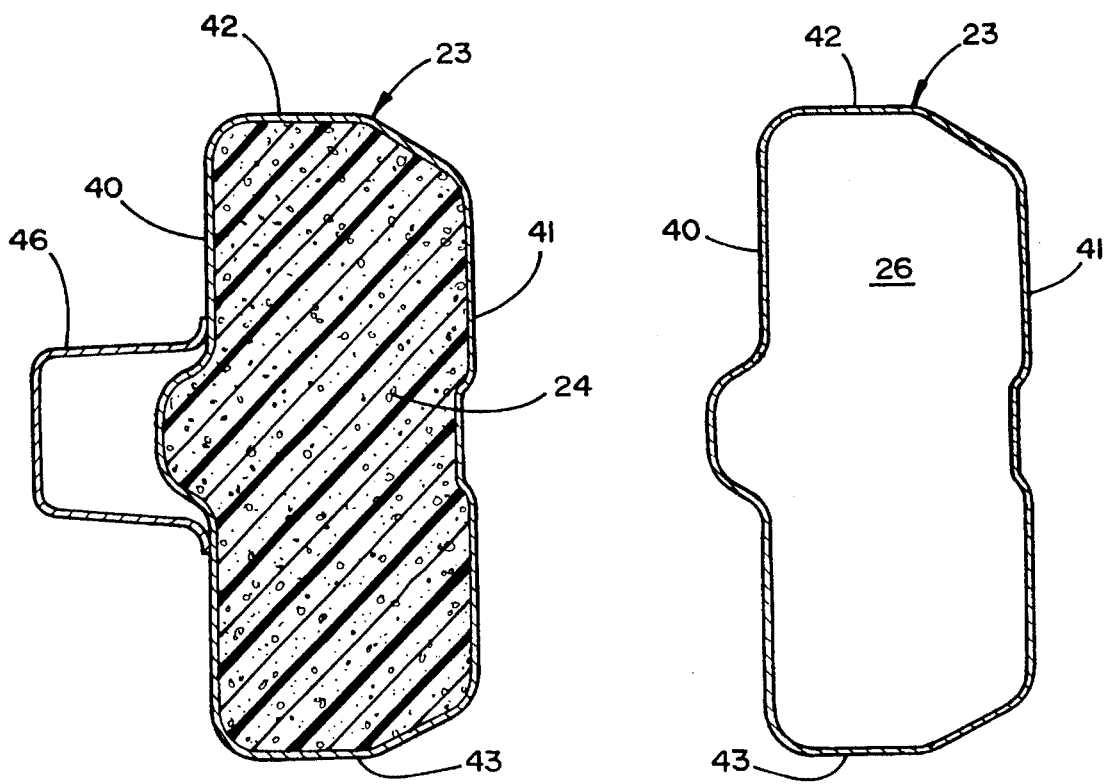
FIG. 2
FIG. 3

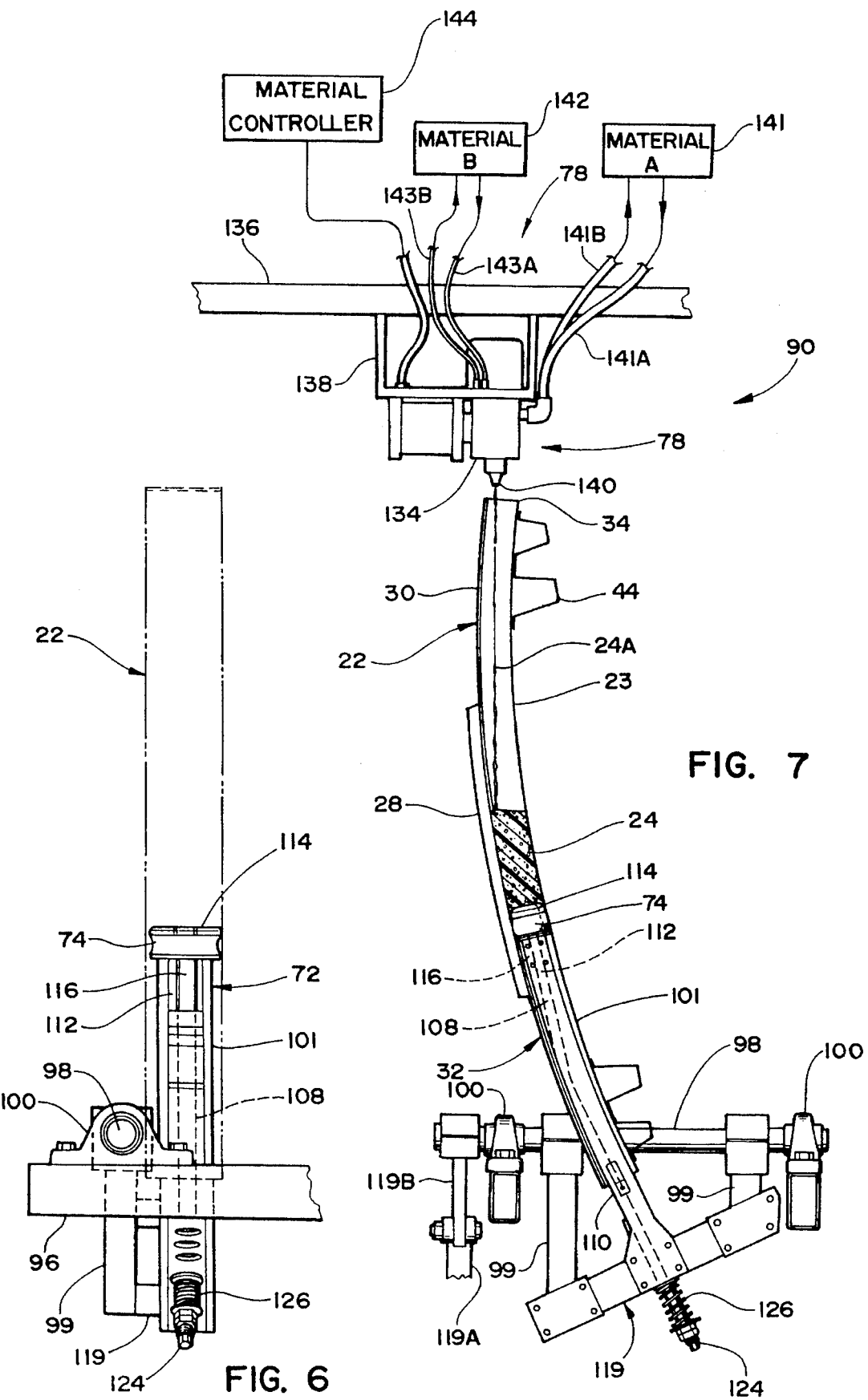

METHOD OF MAKING A VEHICLE BUMPER WITH FOAM THEREIN USING A DEFORMABLE PLUG

This is a divisional application under 37 C.F.R. 1.60 of co-pending prior application Ser. No. 08/194,728, filed Feb. 10, 1994 entitled VEHICLE BUMPER WITH FOAM AND METHOD AND APPARATUS FOR MANUFACTURING THE SAME.

BACKGROUND OF THE INVENTION

The present invention relates to a vehicle bumper construction and an apparatus and method for manufacturing the same. More particularly, the present invention relates to a roll-formed bumper having a predetermined section with foam-in-place material, and a method and apparatus for making the same.

Recently, a novel roll-formed tubular bumper construction was made as disclosed in U.S. Pat. No. 5,092,512 issued Mar. 3, 1992, to Sturrus et al. entitled METHOD OF ROLL-FORMING AN AUTOMOTIVE BUMPER. The novel roll-formed tubular bumper construction has been well received commercially due to the potential cost and weight savings gained over conventional stamped bumpers. However, further improvements in the bumper construction and the apparatus and method for making same are desired so that even greater cost and weight savings are attainable.

One practical reason limiting the choice and thickness of materials in roll-formed tubular bumper constructions are the bumper impact tests required by Federal Motor Vehicle Safety Standards (FMVSS). Specifically, the FMVSS include a pole test and a pendulum test conducted at the center of the front bumper between the bumper-to-vehicle attachment brackets that place a high localized load at the center of the bumper. In conventional bumpers, the center section of the bumper can be specially configured to pass these tests. However, roll-forming processes are not suited for making a specially configured center section. Thus, any means for localized support in this center section must come from secondary operations, or the whole roll-formed tubular bumper construction must be strengthened.

It is known to fill a bumper with foam-in-place material to provide improved strength and improved stress distribution. However, a bumper filled with foam material tends to be unacceptably heavy. Further, the volume of foam material used unacceptably adds to cost. Still further, there is a lack of apparatus and methods for filling bumpers with foam material in an automated manner.

Thus, improvements solving the aforementioned problems are desired in the article, apparatus, and method.

SUMMARY OF THE INVENTION

The invention includes a bumper construction including a center section and end sections having means thereon for mounting on the one of the front end and rear end of a vehicle, and being constructed of a single strip of metal roll-formed into a completely enclosed tubular member having a foam material located in but completely filling only the enclosed central section of the tubular member a relatively short distance on each side of the center line of the vehicle.

This invention also relates to an apparatus for making such bumper which apparatus includes a holder for holding the bumper construction, means for containing the foam-in-place material in the center section of the bumper construction, and a dispenser for dispensing the foam-in-place material into the enclosed central area of the tubular member so that the foam-in-place material completely fills only the center section of the tubular member a relatively short distance on each side of the center of the bumper construction.

In another aspect, the invention includes a fixture for holding a roll-formed tubular bumper construction having material forming open ends and a continuous cross-sectional shape defining an interior space. The fixture includes an arm configured to extend into the tubular bumper construction, the arm including a plugging end configured to engage the bumper material to close off the interior space at a position inward of one of the open ends, whereby polymeric material can be added to the interior space and dammed by the plugging end of the fixture to thus confine and hold the polymeric material in a center section of the tubular bumper construction until the polymeric material cures.

In another aspect, the present invention includes a method for manufacturing a bumper having a tubular shape and ends. The method includes providing a holder for the bumper, plugging the tubular shape of the bumper at a position spaced inward from one of the ends, and partially filling the tubular shape with polymeric material.

In yet another aspect, the present invention includes a process for forming a bumper construction for vehicles, the bumper construction being constructed of a single strip of metal roll-formed into a completely enclosed tubular member and having means for mounting on the front end of the vehicle. The process includes providing a roll-formed bumper, dispensing one of foamable material and foaming material into the enclosed central area of the tubular member so that the material, after foaming, completely fills the enclosed central area, but only fills the enclosed central area of the tubular member a relatively short distance on each side of the center of the bumper construction.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is a perspective view of a roll-formed tubular bumper construction including a section of foam-in-place material located at the center and interior of the bumper construction, the bumper construction being manufactured by an apparatus and a method embodying the present invention;

FIG. 2 is a cross-sectional view taken along the lines II—II in FIG. 1;

FIG. 3 is a cross-sectional view taken along the lines III—III in FIG. 1;

FIG. 6 is an enlarged fragmentary side view of a holder taken in the direction of arrows VI—VI in FIG. 4;

FIG. 7 is an enlarged fragmentary side view of a holder and the injecting head taken in the direction of arrows VII—VII in FIG. 4;

DETAILED DESCRIPTION OF THE PREFERRED EMBODIMENT

Figure 4:
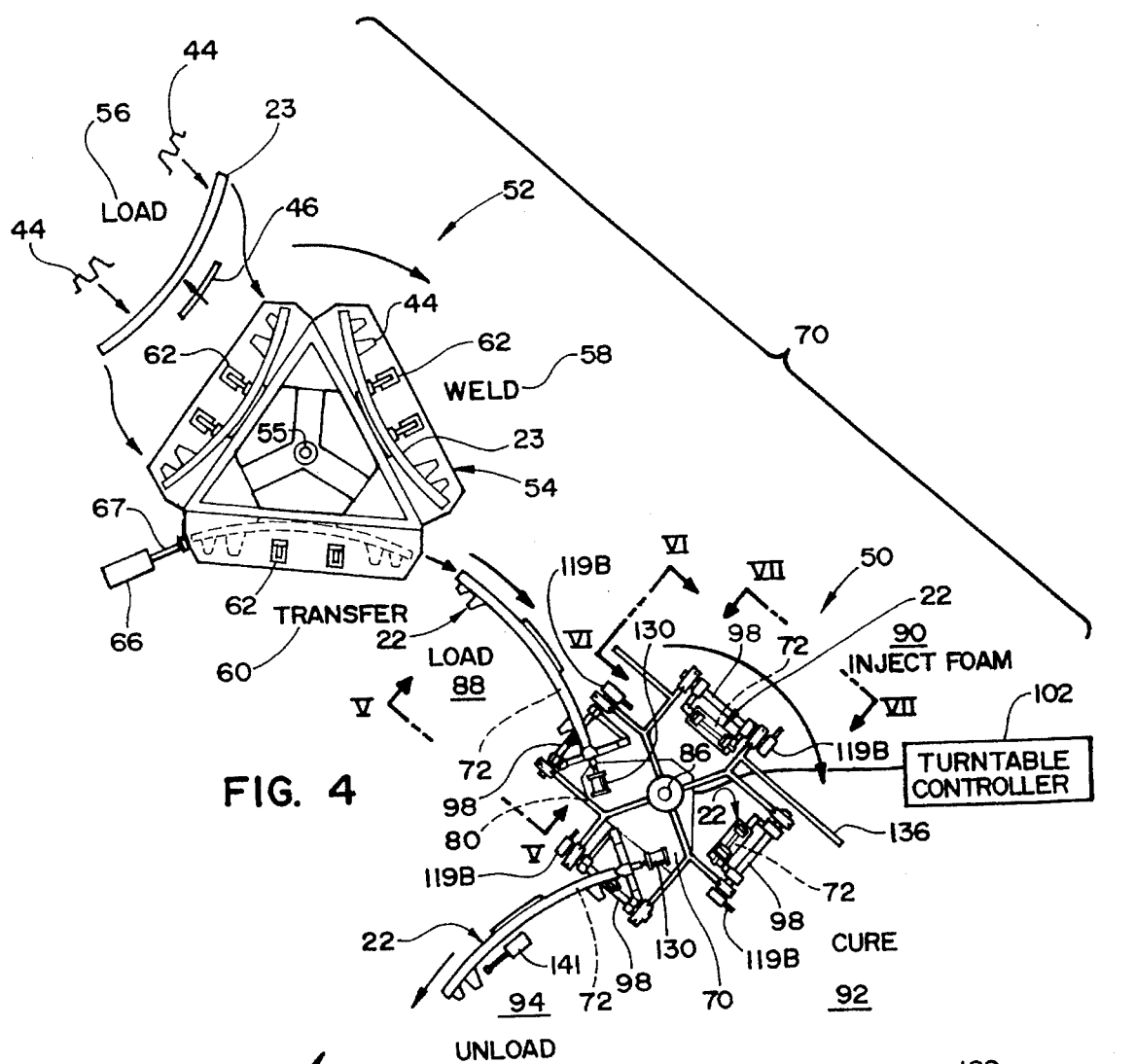
FIG. 4 is a plan view of an apparatus for manufacturing a tubular bumper construction embodying the present invention.

An apparatus 20 (FIG. 4) embodying the present invention is provided for manufacturing roll-formed tubular bumper constructions 22 (FIG. 1) partially filled with a foam-in-place polymeric material 24. Bumpers 22 include a tubular member 23 roll-formed from a sheet into a continuous closed section defining an open interior 26. Tubular member 23 includes a center section 28 and opposing end sections 30 and 32 extending from center section 28. The outer ends 34 and 36 of end sections 30 and 32 are at least temporarily left open so that the foam-in-place material can be dispensed through one of the open ends, for example, end 34, while a plug is extended through the other open end, for example, end 36. The foam-in-place material 24 is contained in the center section 28 of the tubular member 23 by the plug until the foam-in-place material 24 cures sufficiently to hold its shape. After curing, the foam-in-place material 24 forms a rigid internal gusset in the bumper construction bonded to and supporting the center section 28 so that stress is better distributed throughout the center section 28 upon a centered bumper impact.

Tubular member 23 is roll-formed, such as by the process and apparatus disclosed in U.S. Pat. No. 5,092,512 issued Mar. 3, 1992, to Sturrus et al. entitled METHOD OF ROLL-FORMING AN AUTOMOTIVE BUMPER. Notably, tubular member 23 can be curved from end-to-end so that the bumper construction 22 formed with tubular member 23 conforms to modern aerodynamic styling requirements for the front end of an automobile, such as the illustrated embodiment in FIG. 1. Alternatively, it is contemplated that the tubular member can be linear from end-to-end such as is often used for rear bumpers of modern vehicles. Tubular member 23 (FIG. 3) includes a front wall 40, rear wall 41, top wall 42, and bottom wall 43. Attached to the back wall 41 of tubular member 23 are vehicle attachment "W" brackets 44 (FIG. 1) which are welded on end sections 30 and 32. An elongated "U" shaped reinforcement web 46 can be welded along front wall 40 on center section 28 for additional support in the center section 28, if desired.

Center section 28 is further reinforced by the foam-in-place material 24 positioned centrally in center section 28 at the vehicle centerline CL and extending about two inches from center line CL in both directions. Notably, larger or smaller sections of the foam-in-place material 24 could be used, however in the preferred form of the particular bumper construction constructed to date, about four inch total width has been satisfactory. Notably, the section of material fully fills the cross-sectional shape of center section 28 and also bonds to the material of the tubular member 23 as shown in FIG. 2. Thus, foam-in-place material 24 prevents localized deformation in center section 28 such as during a focused impact at the center of the bumper construction 22 (e.g. in the FMVSS pole test on the front bumper). This allows reduction in the tensile strength of the material used to manufacture tubular member 23 and/or a reduction of the thickness of the material.

Apparatus 20 (FIG. 4) includes a foam adding apparatus 50 and a welding/loading apparatus 52 that feeds partially completed welded bumper constructions 22 to foam adding apparatus 50. Welding/loading apparatus 52 is positioned adjacent foam adding apparatus 50. Welding/loading apparatus 52 includes a three-station turntable 54 having a center axis 55, each of the stations 56, 58, and 60 being configured with fixturing 62 for receiving and securely holding tubular member 23. Fixturing 62 is further configured to securely hold attachment "W" brackets 44 against rear wall 44 of tubular member 23 in a position for welding. Tubular member 23 and attachment "W" brackets 44 are manually loaded at load station 56. Upon pressing actuation buttons (not shown), turntable 54 rotates such that the loaded components are moved to weld station 58. Weld station 58 includes welding equipment (not specifically shown) for automatically welding "W" brackets 44 onto tubular member 23 to form welded bumper construction 22. In the next step, turntable 54 is rotated a second time such that the newly formed welded bumper construction 22 is rotated to the transfer station 60. At transfer station 60, a mechanical mechanism 66 including a pusher 67 mechanically slides the welded bumper construction 22 from fixturing 62 onto a selected holder 72 on apparatus 20.

The foam adding apparatus 50 will now be described in more detail. Foam adding apparatus 50 includes a base 80 (FIG. 4) stably engaging a support surface such as a building floor. A turntable 70 is rotatably connected to base 80 for rotation about a vertical axis 86. Mechanical, hydraulic, and electrical components for actuating and controlling foam adding apparatus 50 (and in particular controlling turntable 70 and components thereon) are located in base 80 as required and operably connected to controller 102. Turntable 70 includes a plurality of stations, including a "load" station 88, an "inject foam" station 90, a "cure" station 92, and an "unload" station 94. Four holders 72 are operably mounted to turntable 70 for sequential movement from station-to-station. Holders 72 (FIG. 5) are pivotally mounted to the frame work 96 of turntable 70 by axles 98 and frame mounted bearings 100.

Figure 8:
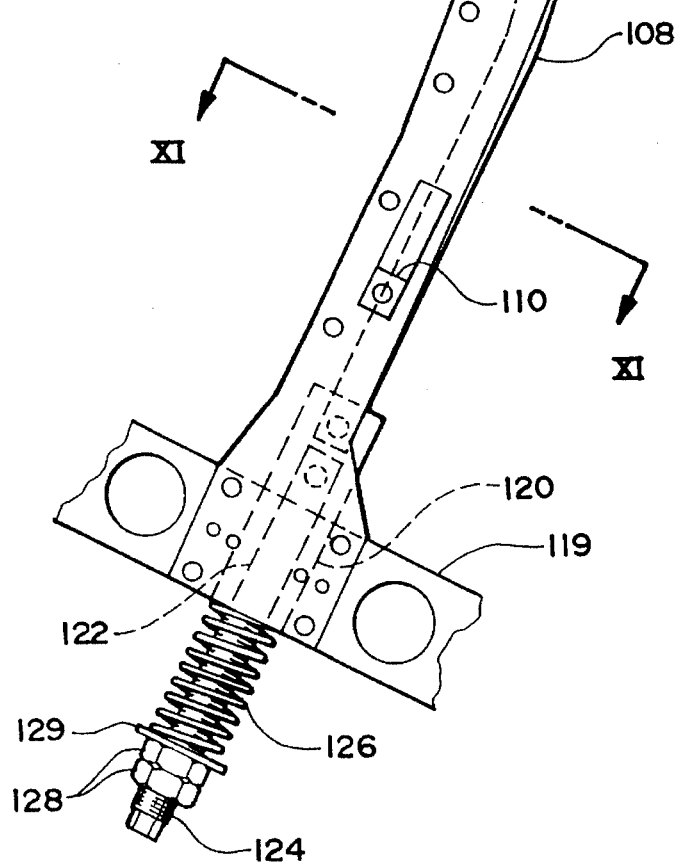
FIG. 8 is an enlarged fragmentary side view of the bumper construction holder comparable to that shown in FIG. 7 but with the bumper construction removed.
Figure 10:
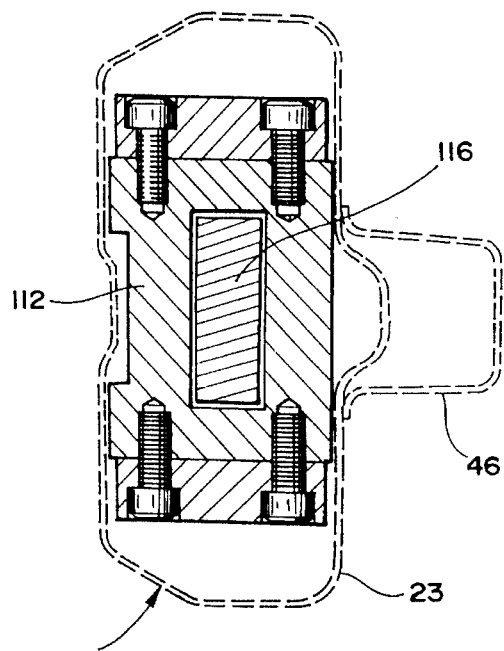
FIG. 10 is a cross-sectional view taken along the lines X—X in FIG. 8.
Figure 11:
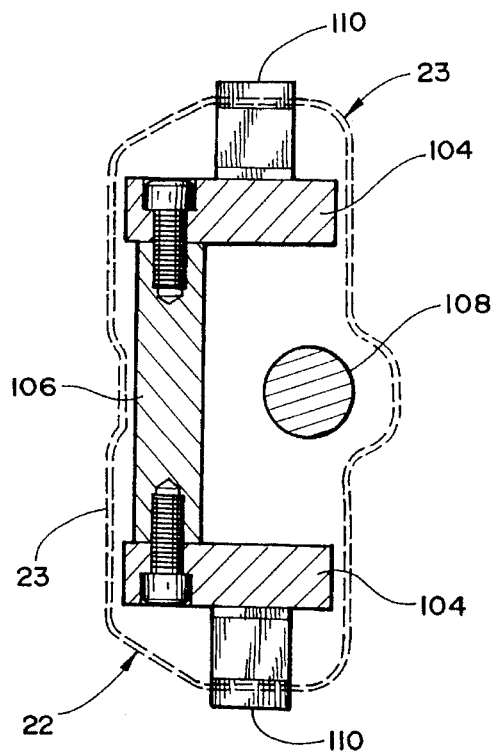
FIG. 11 is a cross-sectional view taken along the lines XI—XI in FIG. 8.
Figure 12:
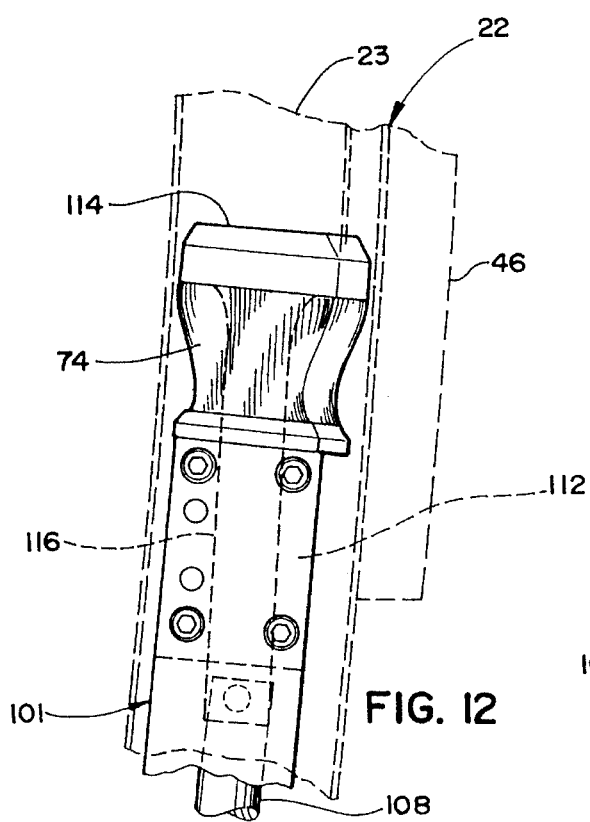
FIG. 12 is an enlarged view of the end of the holder in FIG. 8, the end being shown in the extended position so that the resilient material is not compressed and thus a bumper construction (shown in phantom) can be extended over the end of the holder.
Figure 13:
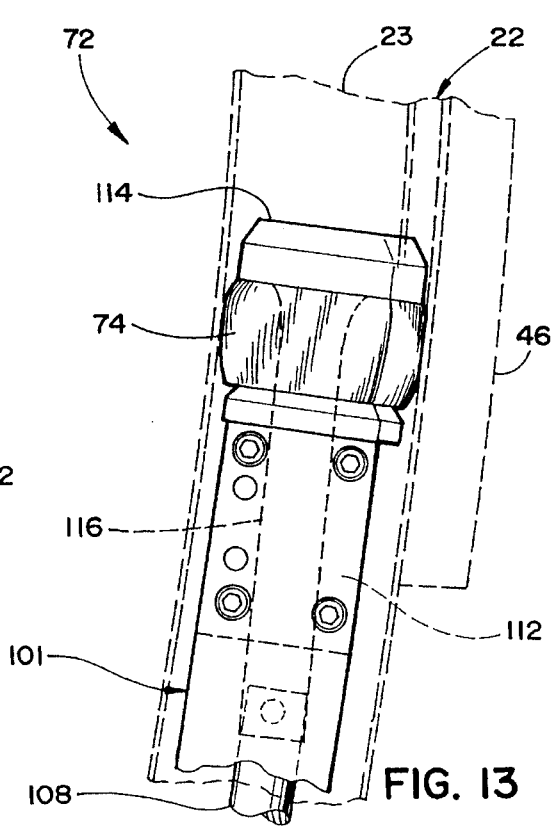
FIG. 13 is a view comparable to FIG. 12 but showing the end of the holder in the retracted position such that the resilient material is squeezed longitudinally and thus expanded against the interior of the bumper construction, thus retaining the bumper construction on the holder and also sealing the bumper construction so that polymeric material can be contained in the bumper construction until the material sets.

Foam adding apparatus 50 includes a turntable 70 provided with four identical pivotally mounted holders 72. More or less holders 72 can be used, if desired. Each holder 72 is shaped to extend partially into tubular member 23 of bumper construction 22 through one of the bumper open ends, for example, end 36 (FIG. 1). Each holder 72 includes a plug 74 (FIG. 5) made of resilient material of about 8½ to 12 Type A durometer located on the free end 76 of holder 72. Plug 74 is configured to slip into the interior space 26 of welded bumper construction 22 (FIG. 12), but is made of a highly resilient material so that when compressed in the longitudinal direction of the tubular member 23, plug 74 bulges and thus expands sealingly against the confines of the cross-sectional shape of open interior 26 (FIG. 13). Holders 72 further include an end plate 114 (FIGS. 5–8, 12, and 13) operably movably mounted adjacent plug 74 for compressing plug 74, as described below. Holders 72 are pivotally mounted for movement between a lowered, horizontal position (FIG. 5) and an upright position (FIG. 6) on a turntable 70. A selected welded bumper construction 22 can be horizontally slipped onto a selected holder 72 when holder 72 is in a lowered position. The welded bumper construction 22 is then pivoted to an upright position by holder 72, and rotated around turntable 70 to a position under a dispensing head or injector 78 (FIG. 7). The foam-in-place material 24 is deposited by injector 78 through upwardly oriented open end 34 into the opening interior 26 of bumper 22. The foam-in-place material 24 is dammed up by plug 74, plug 74 sealingly closing open interior 26, thus containing the foam-in-place material 24 until the material cures sufficiently to hold its shape. Holder 72 is then pivoted downwardly to the lowered position whereupon bumper 22 is removed. Notably, it is contemplated that a plug could also be constructed from an inflatable bladder, and also could be constructed to be a separate part slid into tubular member 23. Holders 72 (FIG. 8) also each include an arm-like frame 101 for extending partially into the interior space of a selected welded bumper construction 22. Frame 101 includes elongated side beams 104, and a cross beam 106 secured between side beams 104 by bolts 105 (FIG. 11). Beams 104 and 106 form a channel in which a cylindrical bar 108 is telescopingly movably positioned. Stops 110 (FIG. 8) protrude outwardly from side beams 104, for abutting the end of a welded bumper construction 22 placed on holder 72 (FIG. 7). A rectangular sleeve-like bearing 112 (FIGS. 7, 8, and 10) is positioned at the end of arm-like frame 101, bearing 112 being adapted to slideably receive a telescopingly mounted bar extension 116. An end plate 114 (FIGS. 7 and 8) is attached to the end of telescopingly mounted bar 108 by bar extension 116, and the resilient polymeric sealing member or plug 74 is positioned between end plate 114 and sleeve-like bearing 112. Plug 74 is constructed to fit mateably into the interior space in tubular member 23 of bumper construction 22 when end plate 114 is pushed to an extended position away from sleeve-like bearing 112 by bar 108 and bar extension 116 (FIG. 13). However, when plug 74 is compressed in the longitudinal direction of bumper construction 22 such as when bar 108 and bar extension 116 are moved to a retracted position (FIG. 14), plug 74 bulges so that it engages and seals against the inside of the tubular member 23. In this position, plug 74 dams up or "plugs" the inside of tubular member 23 so that foam-in-place material 24 cannot leak past plug 74.

At the opposite end of holder 72, arm-like frame 101 (FIG. 7) is fixedly secured to cross frame member 119. Cross frame member 119 is secured to axle 98 by legs 99 and provides the structure upon which holder 72 rotates. An actuator 119A is connected to axle 98 and cross frame 119 by a crank 119B for pivotally raising/lowering holder 72. A second sleeve-like bearing 120 (FIG. 8) is mounted in arm-like frame 101, and a second bar extension 122 is secured to bar 108 and extends slideably through sleeve-like bearing 120. Second bar extension 122 protrudes a distance past cross frame member 119 and terminates in a threaded shaft 124. A coil spring 126 is positioned on shaft 124 and is held on threaded shaft 124 in compression by double nuts 128 and washer 129. Coil spring 126 is compressed between washer 129 and cross frame member 119, and thus biases bar 108, bar extensions 116/122, and end plate 114 to a normally retracted position. As noted previously, this compresses plug 74 so that plug 74 seals against the inside of tubular member 23 thus preventing loss of the foam-in-place material past plug 118.

A hydraulic actuator 130 (FIG. 5) is positioned on turntable frame 96 and includes an extendable rod 132, Rod 132 is axially aligned with bar extension 122 when holder 72 is in the lowered position. By actuation of hydraulic actuator 130, extendable rod 132 extends abuttingly into bar extension 122, overcoming the bias of coil spring 126 to thus extend bar 108 and bar extension 116 and 122 (FIG. 12). Thus, end plate 114 is extended so that plug 118 is decompressed and shrinks to a cross-sectional shape that easily slides within tubular member 23. When turntable 70 is ready to rotatingly cycle, actuator 130 retracts allowing spring 126 to move bar 108 to a retracted position that compresses plug 118 (FIG. 13). This both seals the interior space of tubular member 23, and also holds bumper construction 22 on holder 72.

The inject foam station 90 (FIG. 7) includes an overhead frame 136 and bracketry 138 which supports injector/dispenser 78 in a raised position partially over turntable 70. Injector 78 includes an injector/mix head 134 operably connected to a pair of material sources 140 and 142 by recirculating material lines 141A and 141B, and also material lines 143A and 143B, and to a material controller 144. Material sources 140 and 142 provide the two materials that react and foam upon mixing for making rigid foam-in-place RIM material 24. These materials, the equipment for same such as mix head 134 and controller 144, and the overall systems represented thereby are known in the art and need not be described in detail herein. A number of different materials 140 and 142 can be used such as elastopor P1066U resin and elastopor P1066U isocyanate, respectively, from BASF Corporation, Chemicals Division, of Parsippany, N.J. Preferably, the material bonds to the tubular member 23 during curing.

Figure 5:
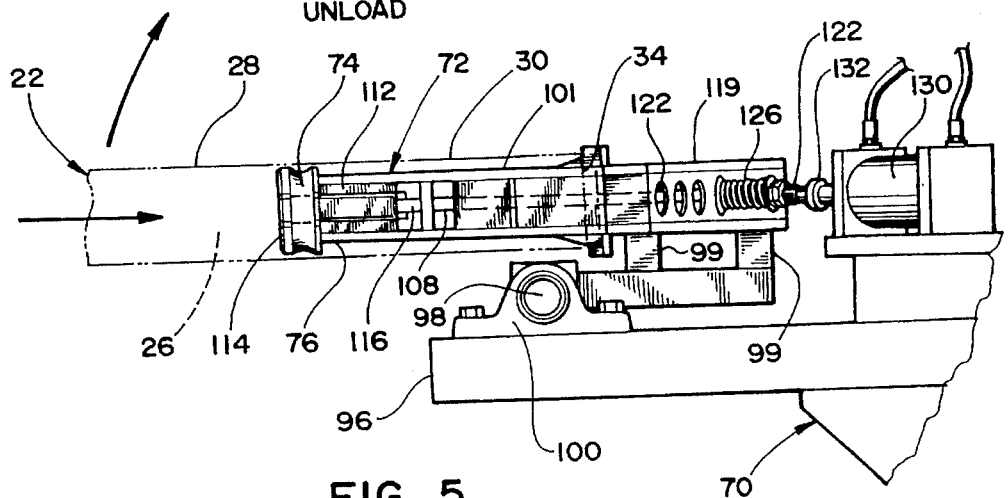
FIG. 5 is an enlarged fragmentary side view of a holder taken in the direction of the arrows V—V in FIG. 4.
Figure 9:
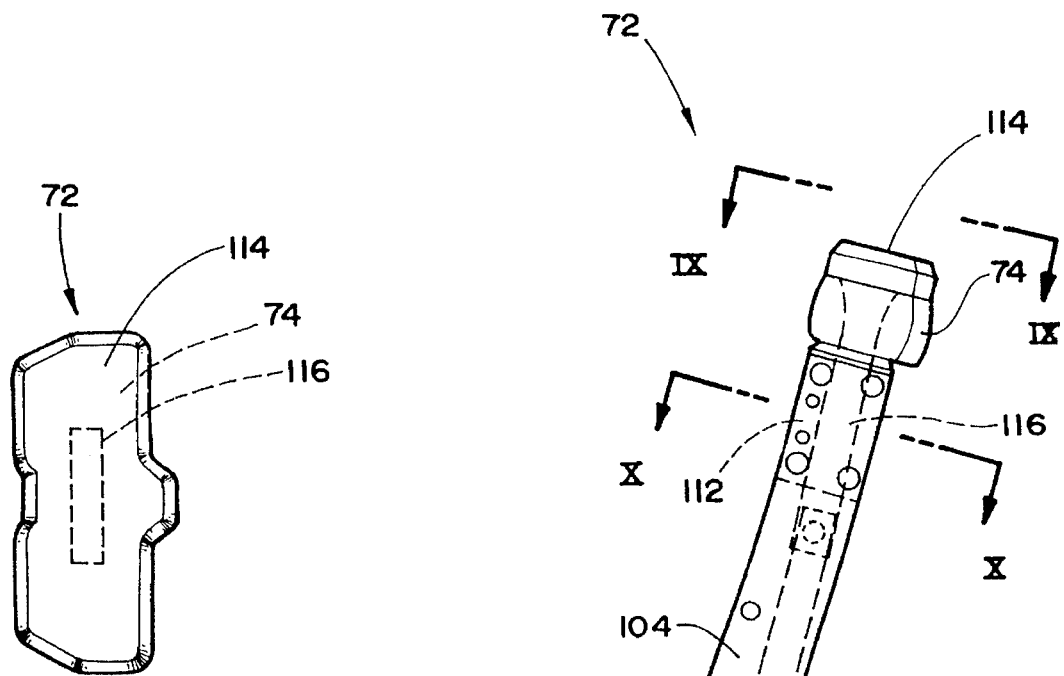
FIG. 9 is an end view of the holder shown in FIG. 8 in the direction indicated by arrows IX—IX.

Injector head 134 includes a dispensing nozzle 140 (FIG. 7) positioned so that it is located over the open end 34 of tubular member 23 of bumper construction 22 when bumper construction 22 is located in the inject foam station 90 (FIG. 4). As shown in FIG. 7, a predetermined amount of foam-inplace material 24 is dispensed via stream 24A into tubular member 23 by dispenser 78. In the preferred embodiment, the material foams to a depth of about 4 inches, although thicker (or thinner) sections are also possible. The bumper construction 22 continues to be held in the upright position as it is moved to the curing station (FIG. 4). The foam-in-place material 24 cures to a semirigid self-supporting mass after several seconds, after which the bumper construction 22 can be lowered by lowering holder 72. The bumper construction 22 can then be removed. In the preferred form, the cycle time is about equal to the necessary cure time for the foam-in-place material 24 to set up sufficiently to be self-supporting. This time is contemplated to be about 20 seconds. To release bumper construction 22 after the addition of the foam-in-place material 24, actuator 30 is actuated to extend end plate 114, and bumper construction 22 is pulled off holder 72 such as by actuator 141. Notably, end plate 114 is made of a non-adherable material to which foam-in-place material 24 does not stick.

A method corresponding to the above noted apparatus will be clearly understood by a person of ordinary skill in the art based upon the above disclosure. Briefly, a roll-formed tubular member is loaded onto fixturing 62 at load station 56 and vehicle attachment brackets 44 are also loaded onto fixturing 62. The start cycle buttons are then actuated, and weld turntable 54 rotates the secured tubular member 23 and brackets 44 to the weld station 58, whereupon weld equipment welds brackets 44 to tubular member 23. Upon the next actuation of the start cycle buttons, weld turntable 54 rotates again and the bumper construction including tubular member 23 and brackets 44 are moved to the transfer station 60, whereupon the welded bumper construction 22 is transferred arcuately longitudinally horizontally onto a holder 72 on turntable 70 of foam dispensing apparatus 50. The welded bumper construction 22 abuts stop 110 as the transfer is finished. Actuator 130 then retracts, allowing spring 126 to retract bar 108, 122 and end plate 114 and thus squeezing plug 74. Thus plug 74 seals against the interior space in tubular member 23, and further securely holds bumper construction 22 on holder 72. When start cycle buttons are again actuated, holder 72 is raised to an upright position and turntable 70 rotates holder 72 and bumper construction 22 under injector/dispenser 78 at inject foam station 90. Injector 78 dispenses a predetermined amount of foam-in-place material 24 into tubular member 23 against end plate 114 and plug 74. The material 24 is contained in tubular member 23 by plug 74. The material is a two-part RIM which immediately begins to react and foam upon being mixed at mix head 134. Upon actuation of the start cycle buttons, the holder 72 is moved to the cure station 92, whereat it continues to be held in the upright position so that the material 24 will cure in the desired shape. Upon actuation of the start cycle buttons, holder 72 is lowered as it is moved to the unload station 94 whereat plug 74 is released by actuator 130 extending bar 108, 116, 122 to move end plate 114. Notably, the actuation of bar 108, 116, 122 is a positive action by actuator 130, thus providing certainty of movement and release. Bumper construction 22 is then telescopingly removed, whereafter the bumper construction 22 is stored or otherwise treated as required to allow for complete curing of the foam-in-place material 24.

Thus there is provided an apparatus and method for manufacture of a partially filled bumper construction which allows for simplicity of operation, and yet full automation. The apparatus includes a holder for the bumper construction, means for containing the foam-in-place material dispensed into the bumper construction, and a dispenser for dispensing the foam-in-place material. Further, the method of manufacturing the bumper construction is also disclosed.

In the foregoing description, it will be readily appreciated by those skilled in the art that modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. A process for forming a bumper construction for a vehicle, said vehicle having sides and from and rear ends with a longitudinal central axis centrally located between said ends, said bumper construction constructed of a single strip of metal roll-formed into a completely enclosed tubular member and having means for mounting on the front end of said vehicle to extend between said sides, comprising:

providing the roll-formed tubular member;

providing an elongated arm configured to be extended partially into the tubular member, the arm including a plug of resilient material adapted to sealingly engage and plug the tubular member;

positioning the tubular member on the arm with the plug located at a predetermined location in the tubular member proximate but spaced from the central axis;

plugging the tubular member by compressing the plug in a longitudinal direction to thus cause the plug to bulge and sealingly engage the tubular member;

injecting one of foamable or foaming material into the enclosed central area of said tubular member against the plug with the plug acting as a dam to contain the injected material in the tubular member so that the injected material, after foaming, completely fills the enclosed central area, but so that the injected material only fills the enclosed central area of said tubular member a relatively short distance on each side of said central axis; and removing the tubular member from the arm by longitudinally decompressing the plug and removing the tubular member including the plug longitudinally from the arm.

2. A method for manufacturing a bumper comprising steps of:

providing a tubular member having a non-circular cross-sectional shape defining a cavity and opposing open ends;

providing a fixture including an elongated arm adapted to be inserted into one of the open ends and also including a plug of resilient material supported on the arm that, when compressed longitudinally, expands in a transverse plane to sealingly engage the cross-sectional shape of the tubular member;

positioning the tubular member on the arm with the plug being located at a predetermined location in the cavity;

compressing the plug longitudinally to cause the plug to bulge and sealingly engage the tubular member;

injecting foam-in-place material into the cavity against the plug and retaining the foam-in-piece material against the plug so that the plug contains the foam-in-place material adjacent the predetermined location until the foam-in-place material cures sufficiently to hold its shape; and decompressing the plug and removing the tubular member from the arm.

3. A method as defined in claim 2 wherein the step of injecting includes dispensing the foam-in-place material into the other open end of the tubular member which is opposite the one open end that receives the arm.

4. A method as defined in claim 3 wherein the step of injecting includes dispensing foam-in-place material into the tubular member by gravity from a dispensing head for dispensing two-component reaction injection material.

5. A method as defined in claim 4 wherein the fixture includes an elongate member operably connected to the arm and to the plug for compressing the plug, and further includes an actuator operably connected to the elongate member, and wherein the step of compressing the plug includes operating the actuator to cause the elongate member to compress the plug longitudinally thus causing the plug to bulge in the transverse plane.

6. A method as defined in claim 2 wherein the non-circular cross-sectional shape of the tubular member includes concave wall sections and convex wall sections, and wherein the step of compressing the plug includes moving side surfaces of the plug into sealing engagement with the concave and convex wall sections.

7. A method for manufacturing an automotive bumper, comprising step of:

providing a tubular member having a predetermined cross-sectional shape and first and second open ends;

extending an arm including an expandable plug into the first open end;

expanding a cross-sectional shape of the plug on the arm to thus cause the plug to sealingly engage the cross-sectional shape of the tubular member at a location spaced from the first open end, and further to hold the tubular member securely on the arm;

positioning the tubular member and the arm as a unit so that the tubular member extends generally vertically and so that the second end of the tubular member is generally above the plug;

injecting one of foamable or foaming material from a dispensing head through the second end onto the plug so that the material, after foaming, completely fills a predetermined cross-sectional area of the tubular member but so that the one material only fills the tubular member a relatively short distance along the length of the tubular member; and reducing the cross sectional shape of the plug and thereafter separating the tubular member from the arm.

8. A method as defined in claim 7 wherein the step of injecting includes dispensing a foaming material through the second end, and holding the dispensed foaming material against the plug by gravity.

* * * * *